Patented Sept. 11, 1934

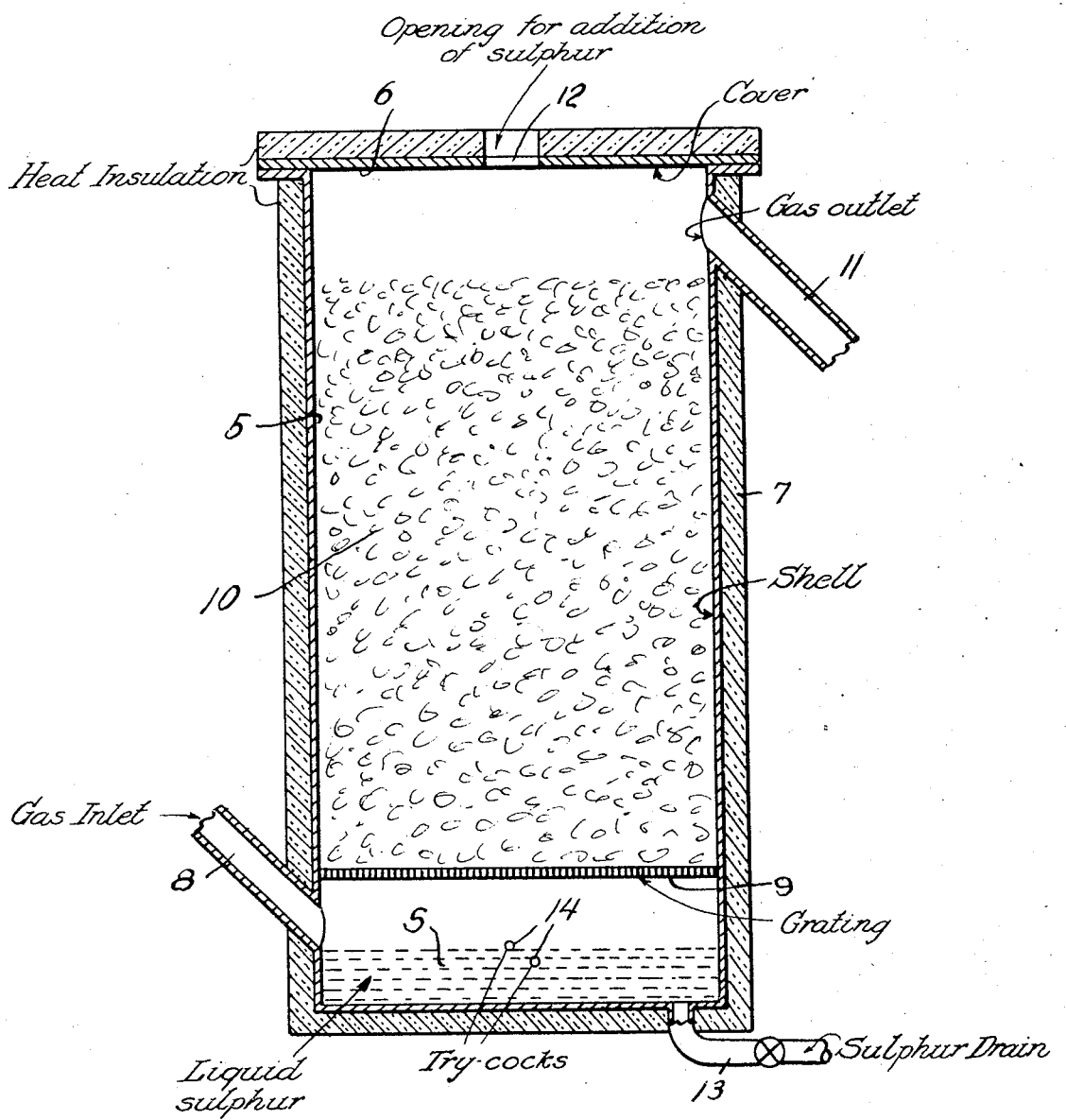

1,972,885

UNITED STATES PATENT OFFICE 1,972,885

TREATING GASES CONTAINING SULPHUR VAPOR

George H. Gleason, Montclair, N. J., and Alfred C. Loonam, Brooklyn, N. Y., assignors to Guggenheim Brothers, New York, N. Y., a copartnership Application March 31, 1932, Serial No. 602,238

8 Claims. (Cl. 23—225)

This invention relates to the treatment of gases containing sulphur vapor, and has for its object the removal from such gases of contaminants which are deleterious in a subsequent treatment operation. The invention is particularly applicable as a preparatory step to the condensation of the sulphur vapor.

Gaseous products containing elemental sulphur vapor which are to be treated for the recovery of the sulphur may, and usually do, contain materials which, if allowed to pass to the sulphur recovery apparatus, will separate out with and contaminate the sulphur product. These contaminants vary with the source of the gaseous product and may be present in the solid, liquid or vapor state. For example, the gaseous product from the reduction of sulphur dioxide by carbonaceous material may contain volatile tarry matters and solid particles of reducing agent, while the gaseous product from the distillation of pyrite may carry volatile compounds of arsenic, antimony, selenium, etc., as well as solid particles of the ore itself. The present invention is concerned with the removal, to an appropriate extent, of such contaminants from the gaseous product prior to its treatment for the recovery of its sulphur vapor content.

The invention is based on our discovery that liquid sulphur provides a most effective and commercially practicable medium for removing such contaminants from the gaseous product. Thus, in accordance with the invention, the gaseous product, at a temperature above the temperature range at which molten sulphur is viscous (160–225° C.), is brought in contact with liquid sulphur. In the course of this contact, the liquid sulphur collects the solid particles carried in suspension in the gaseous product and condenses the tar and other volatile contaminants. It is now our preferred practice to bring the gaseous product in contact with liquid sulphur at an initial temperature of about 350–450° C. and to then pass the gaseous product in contact with counter-currently moving liquid sulphur in a relatively fine state of subdivision. In the course of its contact with the liquid sulphur, the temperature of the gaseous product is lowered, preferably about 100° C. below its initial or entering temperature. The countercurrent flow of the gaseous product and liquid sulphur may advantageously be effected by passing the gaseous product up through a tower of appropriate packing material where the gaseous product comes in contact with descending liquid sulphur.

The treatment contemplated by the invention is in the nature of a washing or scrubbing of the gaseous product with liquid sulphur. In practice, we have found that this treatment may be effectively and conveniently carried out in a tower of suitable proportions, made of steel or the like and filled with a packing such as coke, Raschig "Chemico" rings, or the like, to provide a large gas contact surface over which liquid sulphur flows. The gas inlet is at the bottom and the gas outlet at the top of the tower. The sulphur used for washing or scrubbing may be introduced at the top of the tower as a spray or in fine streams, or the incoming gases may be brought in contact with liquid sulphur in a reservoir at the bottom of the tower at a temperature high enough to permit them to entrain an adequate amount of sulphur vapor, which vapor is allowed to condense and return to the reservoir by causing the temperature to decrease as the gases proceed upward toward the outlet. By the latter procedure we cool the gases, obviate the necessity for a circulating pump, bring comparatively clean sulphur into contact with the gases and secure the benefits of the fact that even fine particles or droplets in suspension act as condensation centers and may be so laden with liquid sulphur that they settle out.

While it is desirable that the exit gases be at such a temperature that they contain the same amount of sulphur as the incoming gases thereby maintaining a constant amount of liquid sulphur in the washer, actual conditions of operation may make this impracticable. In such cases, the amount of liquid sulphur in the washer will change and it will be necessary to add or bleed off liquid sulphur from time to time.

The incoming gases may be bubbled through the liquid sulphur to insure intimate contact. If the incoming gases do not contain enough heat, it may be necessary to supply external heat principally at the bottom of the washer to secure the contemplated circulation of liquid sulphur. Part of the circulating liquid sulphur is drawn off from time to time as the amount and nature of the collected contaminants may warrant and is replaced by clean sulphur. In actual practice, we have found that very satisfactory purification is obtained with an incoming temperature of the gases (entering the washer) such that the temperature of the reservoir of liquid sulphur at the bottom of the washer is from 350° to 450° C., and the washer is so designed and operated that the gases exit at its top at a temperature approximately 100° lower.

In the single figure of the accompanying drawing, there is illustrated, somewhat diagrammatically, a sectional elevation of an apparatus we have employed with marked success in the practice of the invention.

The apparatus illustrated in the drawing comprises a cylindrical steel shell 5 of suitable proportions with a removable cover 6. The shell and cover are surrounded with a layer 7 of suitable heat insulating material in order to conserve the heat of the gases undergoing treatment. The gaseous product containing sulphur vapor enters the bottom of the shell through a gas inlet 8 and come in contact with liquid sulphur (S) in a reservoir at the bottom of the shell. A transverse grid 9 is appropriately mounted within the shell at a suitable distance above the reservoir of molten sulphur and the gas inlet 8. A column or tower of suitable packing material 10 is supported on the grid 9. The shell is provided near its top and above the packing material with a gas outlet 11. An opening 12 is provided in the top of the apparatus for the introduction of liquid sulphur thereto, and a valve controlled outlet 13 is provided at the bottom for the removal, as required, of liquid sulphur from the reservoir S. Two or more try-cocks 14 are provided at suitable levels in the side of the shell 5, to indicate the level of the liquid sulphur in the reservoir S.

After passing over, or bubbling through if desired, the liquid sulphur of the reservoir S, the gaseous product (containing its initial sulphur vapor content together with such additional sulphur vapor as is picked up or entrained during the contact with the liquid sulphur reservoir S) passes upward through the packing 10. In this passage through the tower of packing material, solid contaminants are deposited and volatile contaminants are condensed along with any excess sulphur vapor, and together these deposited and/or condensed materials flow downward over the packing to the sulphur reservoir.

The following example illustrates the efficiency of the treatment operation of the invention: A collection of sulphur from the gaseous product of a furnace, in which sulphur dioxide was reduced by coke, yielded a product which, although containing 98.8% sulphur, was dark-colored and hence of inferior marketability. The inclusion of the treatment step of the invention resulted in raising the sulphur content of the product to better than 99.5%, and the color of the product was substantially identical with that of present day commercial grades of sulphur or brimstone. In this particular instance the heat from the incoming gases was sufficient to maintain the temperature of the liquid sulphur reservoir S at about 410° C. and the temperature of the gases exiting from the outlet 11 was about 305° C.

The treatment operation of the invention is of particular utility where the sulphur vapor is to be condensed to liquid sulphur, as, for example, by the method described in our copending application, Serial No. 602,237 filed March 31, 1932. The treatment of the invention may be carried out on gaseous products containing sulphur vapor from various operations, such, for example, as from the reduction of sulphur dioxide by hot carbonaceous material, either directly or incidentally in pyritic roasting or smelting operations in closed top furnaces, from the distillation of pyrite or purification residues from gas works, etc. In actual practice, we have used the invention with distinct success in the complete process of recovering elemental sulphur from gases containing sulphur dioxide, as described in our copending application, Serial No. 602,236; filed March 31, 1932.

We claim:

1. In the recovery of sulphur from a gaseous product containing sulphur vapor, the step of removing deleterious contaminants from the gaseous product which comprises passing the gaseous product in contact with liquid sulphur at a temperature between about 450° C. and about 250° C., the gaseous product and the liquid sulphur being passed in countercurrent flow.

2. In the recovery of sulphur from a gaseous product containing sulphur vapor, the step of removing deleterious contaminants from the gaseous product preparatory to the condensation of the sulphur vapor which comprises passing the gaseous product in contact with liquid sulphur at an initial temperature of about 350–450° C. and an exit temperature of about 100° below the initial temperature, the gaseous product and the liquid sulphur being passed in countercurrent flow.

3. In the recovery of sulphur from a gaseous product containing sulphur vapor, the step of removing deleterious contaminants from the gaseous product which comprises passing the gaseous product over or through a reservoir of liquid sulphur and up through a tower of appropriate packing material where the gaseous product comes in contact with descending liquid sulphur.

4. In the recovery of sulphur from a gaseous product containing sulphur vapor, the step of removing deleterious contaminants from the gaseous product preparatory to the condensation of the sulphur vapor which comprises passing the gaseous product at an initial temperature of about 350°–450° C. over or through a reservoir of liquid sulphur and up through a tower of appropriate packing material where the gaseous product comes in contact with descending liquid sulphur.

5. In the recovery of sulphur from a gaseous product containing sulphur vapor, the step of removing deleterious contaminants from the gaseous product which comprises passing the gaseous product at a temperature above 225° C. in contact with countercurrently moving liquid sulphur.

6. In the recovery of sulphur from a gaseous product containing sulphur vapor, the step of removing deleterious contaminants from the gaseous product which comprises passing the gaseous product at a temperature above 225° C. up through a tower of appropriate packing material and in contact with a relatively large surface of descending liquid sulphur.

7. In the recovery of sulphur from a gaseous product containing sulphur vapor, the method of removing the deleterious contaminants which comprises passing the gaseous product in contact with liquid sulphur, and regulating the operation to avoid substantial reduction of the amount of sulphur in the gaseous product.

8. In the recovery of sulphur from a gaseous product containing sulphur vapor, the method of removing deleterious contaminants which comprises passing the gaseous product in contact with a body of liquid sulphur and through a tower of appropriate packing material where the gaseous product comes in contact with descending liquid sulphur, and regulating the operation to avoid substantial reduction of the amount of sulphur in the gaseous product.

GEORGE H. GLEASON.
ALFRED C. LOONAM.